United States Patent Office 3,679,508
Patented July 25, 1972

3,679,508
METHOD AND APPARATUS FOR MAKING PLASTIC TUBING
Joseph C. Weidel, Bonita, Calif., assignor to Rohr Corporation, Chula Vista, Calif.
Continuation-in-part of application Ser. No. 499,572, Oct. 21, 1965. This application Apr. 10, 1969, Ser. No. 814,905
Int. Cl. B65h 81/00
U.S. Cl. 156—173  11 Claims

ABSTRACT OF THE DISCLOSURE

Peripheral segments of a cylindrical mandrel are reciprocally and successively moved in an axial direction on the mandrel as the latter is rotated. A tape is wrapped around the peripheral segments as the mandrel is rotated, and the reciprocal movement of said segments causes this tape to advance toward one end of the mandrel. As the tape advances it is alternately wound with filaments which are coated with resin and filaments which are uncoated. The tape and filament windings thereon are advanced by the reciprocal movement of the peripheral mandrel segments to a heater which surrounds the mandrel, where the resin on the coated filaments is cured to thereby form a rigid plastic tube which continuously moves off the mandrel.

BACKGROUND OF THE INVENTION

This is a continuation-in-part of my U.S. patent application Ser. No. 499,572, filed Oct. 21, 1965, now Pat. No. 3,441,195, issued Apr. 29, 1969, and relates generally to the making of endless reinforced wrapped plastic pipe or tubing and more particularly to a new and improved method and apparatus for making tubing of this type on a mandrel of discrete length which effectively advances the formed tubing thereon whereby the same may be continuously manufactured without limit as to length.

Prior art methods for making endless tubing, such as exemplified by Pats. Nos. 3,004,585 and 3,130,104, similarly employ mandrels of discrete length upon which are similarly wrapped resin impregnated elements, or arrays of elements, such as fiber glass rovings. The prior art mandrels, however, in order to advance the tubing formed thereon, necessarily are formed of tubular configuration and require a plurality of endless ribbon or chain type conveyor elements which are spaced circumferentially on the mandrel and driven longitudinally over the exterior surface thereof and thence returned internally of the mandrel.

This prior art mandrel construction, in addition to being complex and expensive to make and operate, has a number of inherent disadvantages and limitations due to the conveyor elements which necessarily extend outwardly of the mandrel supporting surface and in spaced relation thereabout. Thus, for example, if the bottom layer or roving is wound directly onto the longitudinally movable conveyor elements, the irregularity in the supporting surface of necessity is reproduced in the inner surface of the formed pipe. Such irregularity in the pipe surface tends to increase the amount of friction to fluid flow therein and this renders the resulting pipe product commercially unacceptable. Another difficulty with the conveyor element arrangement is the possibility of clogging due to resin getting between the conveyor elements and the surface of the mandrel which would prevent or greatly impair the operation of the conveyor elements on the mandrel. In order to avoid these difficulties, the prior art mandrels employ a thin flexible steel wrapper which is wound onto the moving conveyor elements to overlie the same and thereby minimize the surface irregularity and prevent any resin from coming into contact with either the conveyor elements or the mandrel. To this end, the wrapper underlies the first layer of fiber glass roving and serves as a separator layer. Since the wrapper does not become a part of the finished pipe the same must be stripped away as the formed pipe leaves the mandrel. As a practical matter, although this necessarily adds to the complexity of the apparatus, provision is therefore made in the prior art mandrel arrangements for returning the steel wrapper as an endless element internally of the mandrel.

SUMMARY OF THE INVENTION

The mandrel arrangement of the present invention obviates any need for the conveyor and wrapper elements of the prior art mandrels and thus avoids their inherent functional difficulties, complexities, and attendant costs and maintenance problems. This improvement is made possible by a novel mandrel construction wherein the mandrel per se provides a continuously and progressively movable surface for longitudinally advancing the formed tubing thereon. In this construction, the mandrel is mounted for rotation about its longitudinal axis and comprises a plurality of slats or circumferentially disposed segments which are separately slidably mounted side by side for reciprocal movement longitudinally of the mandrel. Longitudinal reciprocal motion is imparted to the mandrel slats or segments by means of a rotating annular cam with which each slat has a separate driving connection. The cam has a gradual advance and relatively sharp return with the result that, at any instant of cam rotation, all but one of the mandrel segments are being progressively advanced by the cam and said one of the segments is being returned thereby. As otherwise expressed, the slats are returned one at a time in sequential order by the sharp return portion of the cam during each revolution of the cam. The return time for each cam thus corresponds to only a fraction of a revolution of the cam. During the remaining time of each revolution, however, each slat is relatively slowly advanced. It will be understood that the cam might have several annularly spaced gradual advance and sharp return portions such that the slats may be advanced and returned several times during each revolution of the cam and thus, if desired, more than one slat at a time may be returned.

Notwithstanding the fact that each reciprocable segment must be cyclically returned at least one during each revolution of the cam to renew its forward advance, the progressively advancing segments collectively create the effect of a longitudinally movable surface, and all that is required to effectively advance the formed tubing thereon is that there is a net forward moving support surface for the tubing, as when the composite supporting surface area of the progressively advancing mandrel segments exceeds that of the one, or more, segments which cyclically may be undergoing return movement by the rotating cam.

The mandrel arrangement of the present invention, moreover, is such that it provides the necessary continuous annular support for the tubing formed thereon without requiring a metallic separator wrapper in order to avoid the surface irregularities otherwise formed in the prior art endless pipe products. Although, in accordance with the mandrel construction and arrangement of the present invention, at least one slat necessarily must be moving back while the others are advancing, this reverse movement is only momentary and thus does not adversely impair the operation of the device or the surface quality and smoothness of the pipe products formed thereon.

By mounting a supporting shaft for the mandrel in a series of separable power drive connectors, it is possible to feed onto the mandrel various standard plastic nipples or couplings and to move them along the mandrel to the wrapping station where they can become bonded to and integrated with the plastic tubing.

OBJECTS OF THE INVENTION

An object of the present invention therefore is to provide a new and improved method and apparatus for making endless reinforced plastic tubing from resin impregnated elements.

Another object is to provide a mandrel for advancing the tubing formed thereon while also providing continuous annular support therefor.

Another object is to provide a mandrel for forming, supporting and advancing endless reinforced wrapped plastic tubing thereon free of distortion and wrinkling effects.

Another object is to provide a circumferentially segmented mandrel comprising longitudinally reciprocable segments in which the composite surface area of the advancing segments exceeds that of any returning segments.

Another object is to provide an arrangement for progressively advancing all but one of a plurality of mandrel segment surfaces while momentarily returning said one of said surfaces.

Another object is to provide an apparatus for making endless reinforced plastic tubing which incorporates a simple and unique means for imparting the necessary longitudinal motion to the formed tubing.

Still another object is to provide an apparatus which incorporates means for feeding onto a wrapping mandrel standard plastic nipples or couplings in order that they may be bonded to the plastic tubing.

DESCRIPTION OF THE DRAWINGS

Throughout the drawings and the following specification, the same numbers designate the same parts.

DETAILED DESCRIPTION

In accordance with the invention, plastic tubing is continuously formed on a mandrel of the type disclosed in co-pending U.S. patent application Ser. No. 499,572 (which will issue as Pat. No. 3,441,459), filed by J. C. Weidel, the inventor of the apparatus and process herein disclosed, on Oct. 21, 1965 and assigned by him to the assignee of the present application, Rohr Corporation. For a complete description of the construction and operation of the aforesaid mandrel, the reader is referred to the identified patent, wherein components of the mandrel are designated by the same reference numbers used hereinafter.

Figure 2:
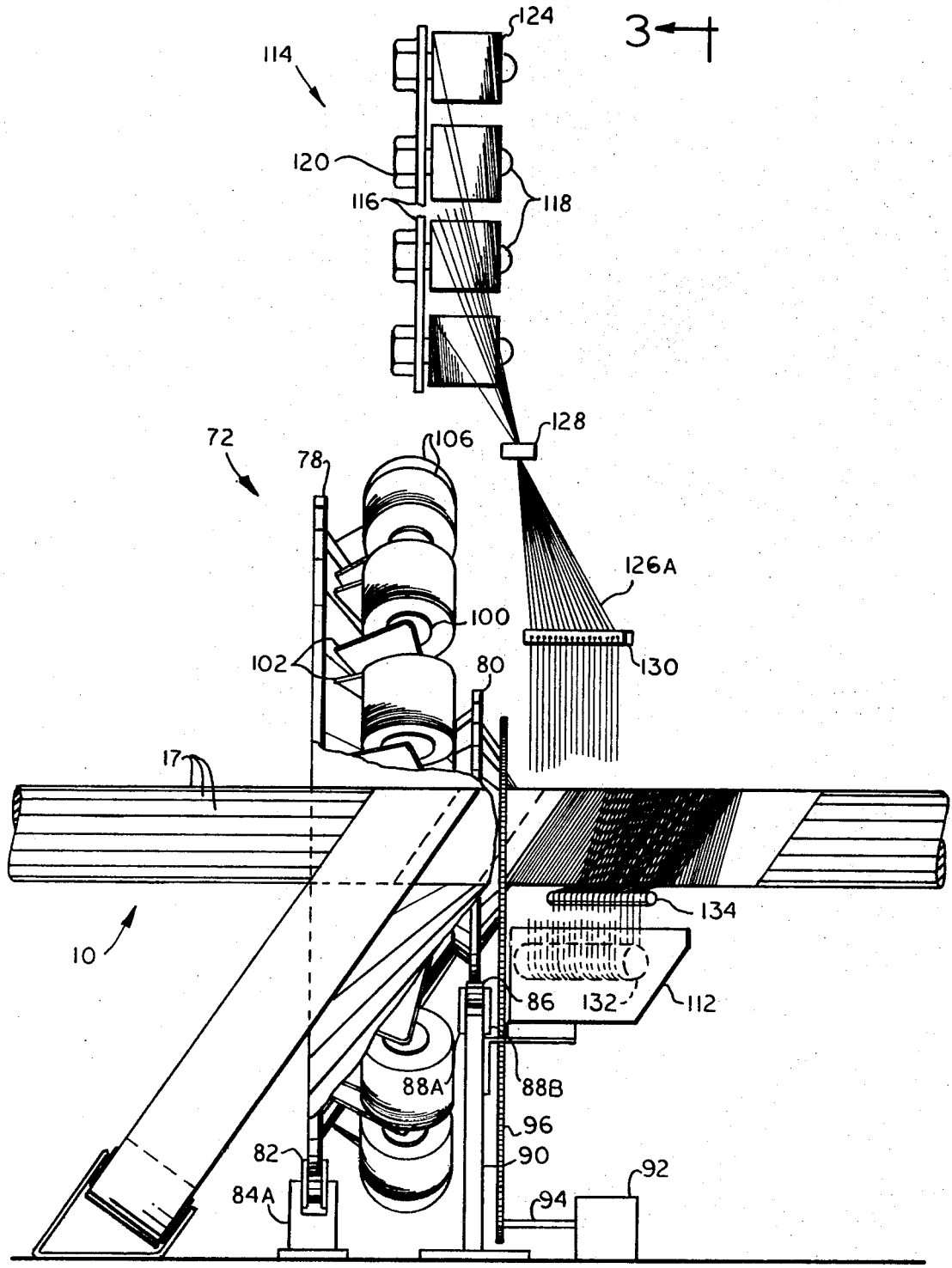
FIG. 2 is an enlarged side elevation of one of said filament carriers and a portion of a filament support member positioned thereabove, a portion of the illustrated filament carrier being broken away in the drawing for clarity.
Figure 3:
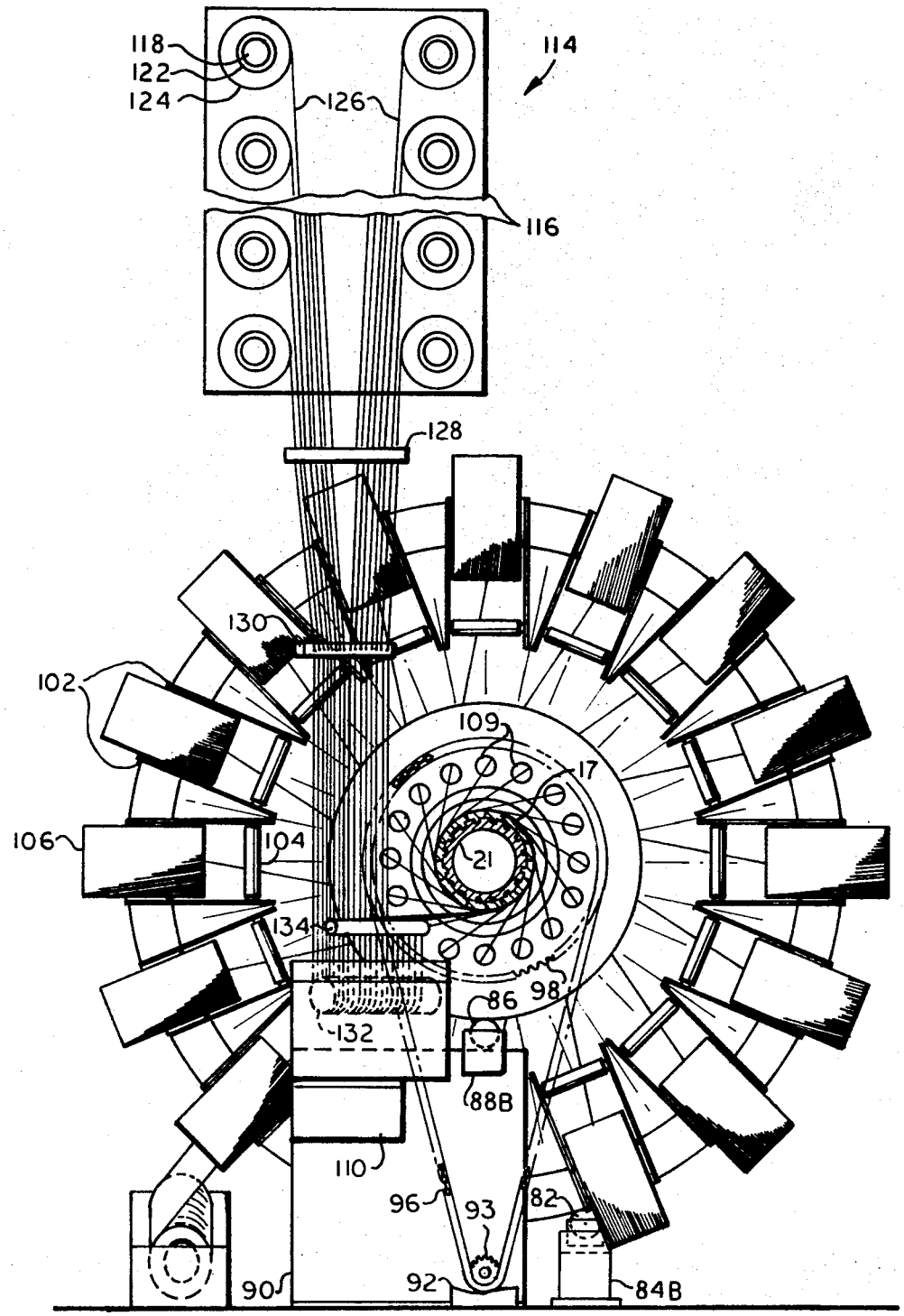
FIG. 3 is an end elevation of the components shown in FIG. 2, taken along the vertical plane represented by line 3—3 in the last-mentioned drawing and in the direction indicated therein, a portion of an electric motor being broken away in the drawing so that a sprocket can be seen.
Figure 4:
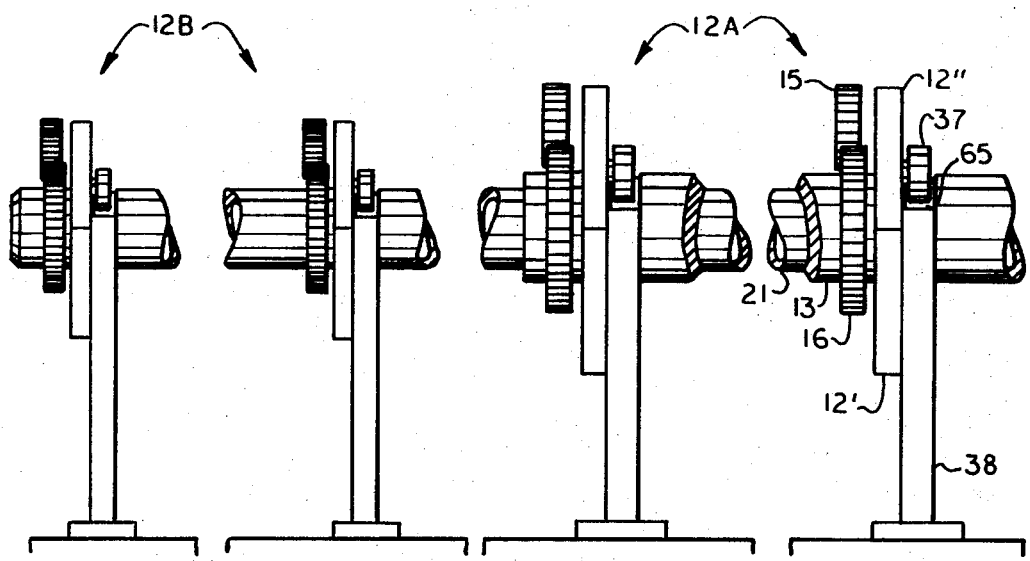
FIG. 4 is a side elevation of support and drive assemblies associated with the aforesaid mandrel.

FIGS. 1–4 illustrate a mandrel, generally designated by the number 10, which comprises a hollow shaft 21 one portion of which is enlarged and formed at its outer surface with a plurality of longitudinally extending, circumferentially spaced slots. Disposed side-by-side around the enlarged portion of shaft 21 are a plurality of elongate segments or slats 17 each having an inner portion which is slidably engaged within a respective one of the slots in said shaft. FIG. 4 illustrates a portion of a tubular cam shaft 13 through which the smaller diameter portion of shaft 21 extends. As fully described in the referenced Weidel patent, a shoulder shaped cam (not shown) extends around one end of cam shaft 13, and each segment 17 projects from the enlarged portion of shaft 21 over the end of the cam shaft and the cam shoulder on the latter is disposed within cam follower slots or notches extending across the inwardly facing sides of the extended sections of the segments. Thus rotation of cam shaft 13 about shaft 21 effects successive movement of segments 17 slowly toward the right (as the mandrel is viewed in FIG. 1) until a return portion of the aforementioned cam shoulder reaches the cam follower slot of a particular segment, at which time the segment engaged by said return portion is rapidly moved toward the left end of the mandrel and back to its starting point of travel, all as more fully explained in the noted patent.

As illustrated in FIG. 4, shaft 21 and cam shaft 13 are each supported and rotated by means of two support and drive assemblies or connectors 12A, 12B each of which is identical to the mechanisms designated by the same number in the above mentioned patent, to which the reader is directed for a detailed description of the same. It should be noted at this point, however, that in the apparatus described in the prior Weidel patent only cam shaft 13 is supported and driven by a pair of assemblies 12, and shaft 21 is supported by means which keep it from rotating. In contrast with this arrangement, in the apparatus disclosed herein both shafts 13, 21 are supported and rotated by a pair of assemblies 12A, 12B. As set forth in the prior patent, each assembly 12 comprises a pair of arms 12', 12" pivotally mounted on a vertically disposed support plate 38 so that they can be moved close to, or away from, shafts 13, 21 respectively. Arms 12', 12" carry rollers 37 which abut the bottom surfaces of grooves 65 extending around shafts 13, 21 when the arms are disposed adjacent the shafts, thus providing support for the latter while permitting rotation thereof. Both shafts have a pair of gears 16 mounted thereon and respectively located adjacent said grooves therein, and one of the arms 12', 12" carries a drive gear 15 which is rotated by conventional means (not shown) to thereby turn the associated shaft at a selected angular velocity. Thus each shaft 13, 21 can be rotated by one of the assemblies 12 when the arms 12', 12" of the other assembly associated with the shaft have been pivoted away from the surface thereof. The above described support and drive assemblies are positioned to the left of mandrel 10 as it is viewed in FIG. 1.

Figure 1:
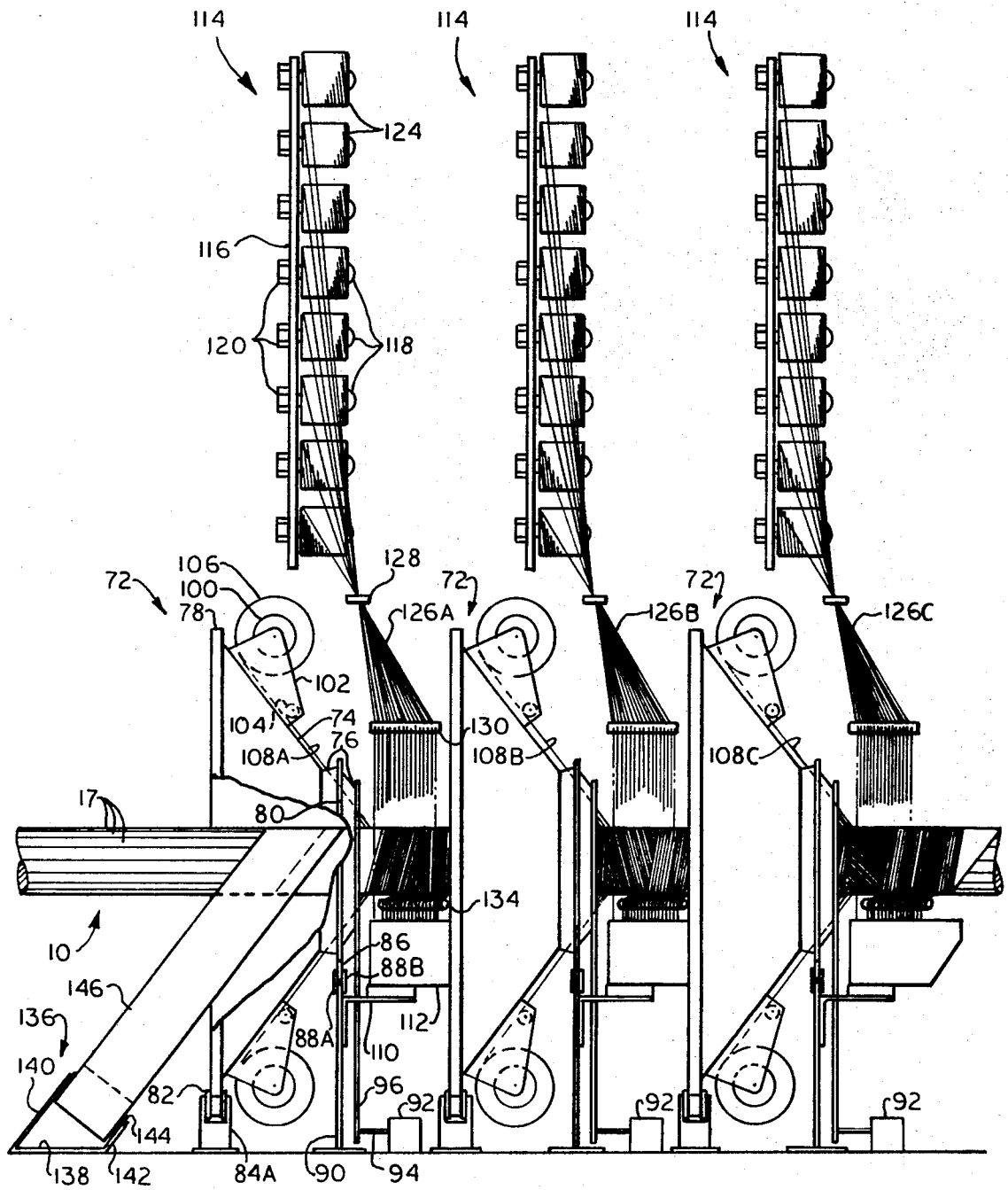
FIG. 1 is a side elevation of a preferred embodiment of this invention, ends of a mandrel and a portion of one of three annular filament carriers disposed around said mandrel being broken away in the drawing, which is simplified in that it illustrates only two of a number of filament spools mounted on each filament carrier.

FIG. 1 illustrates three annular filament carriers which are coaxially disposed around mandrel 10, each carrier being generally designated by the number 72 and comprising a first portion 74 which has the form of a hollow truncated cone and an annular second portion 76 which projects axially from the smaller end of said first portion. A first flange 78 extends around the larger end of said first portion of each filament carrier 72 and is fixedly attached thereto with the sides thereof disposed perpendicular to the longitudinal axis of mandrel 10, and a second flange 80 extends around said second portion 76 of the carrier and is fixedly attached thereto with the sides thereof also disposed perpendicular to said longitudinal axis. The flange 78 of a carrier 72 is supported on two flanged rollers 82 which are respectively mounted on support blocks 84A, 84B (see FIGS. 1 and 3) for rotation about axes disposed parallel with the longitudinal axis of mandrel 10. Similarly, the flange 80 of said carriers is supported on a roller 86 which is mounted between lugs 88A, 88B on a support plate 90 for rotation about an axis parallel with the longitudinal axis of the mandrel. Fixedly positioned under each filament carrier 72 is an electric motor 92 provided with speed reduction gears and having a sprocket 93 (see FIG. 3) mounted on the drive shaft 94 thereof. A chain link belt 96 is meshed with the sprocket of each motor 92 and with a sprocket 98 (also illustrated in FIG. 3) fixedly mounted on the free end of second portion 76 of a respective one of the filament carriers. As illustrated in FIGS. 2 and 3, a plurality of spools 100 are respectively mounted between arms 102 which project from the outer surface of first portion 74 of each filament carrier adjacent its flange 78, said spools being evenly spaced apart circumferentially of the filament carrier and their axes of rotation being disposed transverse to the longitudinal axis of mandrel 10 and lying in a plane perpendicular thereto. A guide roller 104 (see FIG. 1) extends between and is rotatably connected to each associated pair of arms 102. On each spool 100 is wound a coil 106 of filament 108 (for more specific identification, the filaments on the different spools are designated as 108A through 108C, respectively) and this filament passes from the coil under the adjacent roller 104 and thence through one of a plurality of apertures 109 (see FIG. 3) which extend through second portion 76 of the supporting carrier 72 and through sprocket 98 in the direction indicated by the broken line portion of the filament which appears in FIG. 1. Filaments 108 then extend to mandrel 10.

Fixedly mounted on each support plate 90 is an L-shaped member 110 the projecting arm of which supports a resin container 112, and fixedly mounted above each resin container on conventional support structure (which is not shown in order to simplify the drawings) is a filament support member generally designated by the number 114. Each filament support member comprises a plate 116 and a plurality of machine screws 118 which extend through threaded holes in said plate and are fixedly secured therein by means of nuts 120. A spool 122 is rotatably supported on the shank of each screw 118 and carries a coil 124 of filament 126 (for more specific identification, the filaments on the different spools are designated as 126A through 126C, respectively). Apertured guide bars 128, 130 are fixedly positioned between each filament support member 114 and the resin container 112 located thereunder, filaments 126 extending from coils 124 through the holes in said guide bars and down to said container where they loop around a roller 132 rotatably mounted within the latter. Roller 132 is disposed at an angle to the longitudinal axis of mandrel 10 and is submerged in a heat-hardenable resin held in container 112. Filaments 126 extend vertically from roller 132 to another roller 134 rotatably mounted adjacent the lowest portion of mandrel 10 and disposed at an angle to the longitudinal axis thereof, and then the filaments extend substantially horizontally to the mandrel.

Fixedly positioned under mandrel 10 between the aforedescribed support and drive assemblies 12 and the filament carrier 72 nearest the latter is a tape support, generally designated by the number 136. This support comprises a base 138, a pair of arms 140, 142, and a spool 144 on which a coil of tape 146 is wound. The tape extends to the mandrel and, as the latter is rotated, is wound therearound. Preferably the side of the tape which does not contact the mandrel is coated with adhesive.

Apparatus in accordance with this invention also preferably includes a heating unit (not shown) such as that described and illustrated in the aforementioned U.S. Pat. 3,441,459 and designated therein by the number 31, which unit is positioned around mandrel 10 beyond the portion thereof which is on the right in FIG. 1. Tubing which is formed on the mandrel and hardened in the heating unit is also preferably supported by a roller assemby, such as that designated by the number 32 in the prior patent, after the tubing moves off the free end of said mandrel.

OPERATION

After tape 146 has been looped around mandrel 10, it is wound thereon and moved through the adjacent filament carrier 72 by the rotation of drive gears of assemblies 12A, 12B at different angular velocities, which differential rotational velocity causes segments 17 to reciprocate as previously described, while the mandrel is rotating, and causes tape 146 to move to the right in FIG. 1. The operation of the mandrel is stopped when the tape reaches a point to the right of the first filament carrier (as the apparatus is viewed in FIG. 1) and filaments 108A carried by the latter are attached to the tape by suitable means, such as small pieces of adhesive coated tape. Drive gears are then again rotated while the first filament carrier is also rotated by its motor 92, thus winding filaments 108A around tape 146 and advancing both the latter and the filament wound thereon to a point beyond the filaments 126A which are carried on the filament support member 114 which is on the left in FIG. 1. The rotations of mandrel 10 and the first filament carrier 72 are then stopped to permit the attachment of filaments 126A to the winding of filaments 108A on the mandrel. It will be recognized that the same procedure can be followed in order to attach filaments 108B, 126B, 108C, 126C to the mandrel in the order given, after which the operation of the apparatus may be continuous. The superposed windings of filaments, alternately dry (i.e., uncoated with resin) and coated with resin held in containers 112, are advanced by the action of mandrel 10 to the heating unit which surrounds the free end of the latter, where the resin on the coated filaments is cured to thereby form a strong, hard plastic tubing. The hardened tubing can be cut into any desired lengths after it moves off the end of mandrel 10. Preferably tubular fitting assemblies of the type designated by the numbers 55, 55', 56 in U.S. Pat. No. 3,441,459 are incorporated into the tubing as it is being formed. Because of the arrangement of the support and drive assemblies 12A, 12B of mandrel 10, the insertion of such fitting assemblies into the tubing formed on the mandrel can readily be effected. While the mandrel is being rotated by the drive assembly 12B which is adjacent the end of cam shaft 13 (see FIG. 4), the arms 12' and 12" of the other drive assembly 12B are pivoted away from shaft 21 to permit one of said fitting assemblies to be sleeved around the latter and moved to a point adjacent the operating drive assembly 12B. The arms of the first drive assembly 12B are then pivoted so as to engage the rollers 37 and drive gear 15 carried thereby with shaft 21 and its gear 16 respectively, after which the first drive assembly can be employed to rotate said shaft while the arms of the second drive assembly 12B are pivoted away from the latter to permit movement of the fitting assembly to a point adjacent the drive assembly 12A which is most remote from the filament carriers 72. It will be understood that the arms 12' and 12" of the two drive assemblies 12A can also be opened consecutively to thereby permit movement of the fitting assembly to a point where tape 146 can be wrapped around it, without interrupting the rotation of cam shaft 13. As tape is wound around the fitting assembly, the latter is pulled along mandrel 10. Hence the filaments 108 and 126 are wound around the fitting assembly and, if its outer surface is coated with a suitable heat curable resin, the latter is bonded to the layers of tape and filament as the section of tubing passes through the aforementioned heating unit.

One of the important advantages of the described apparatus and method of forming plastic tubing is that the orientation of the windings of filaments of the tubing formed thereby can readily be controlled by the direction and angular velocity of filament carriers 72 relative to mandrel 10 and by the rate of advancement of tape 146 along the mandrel. It will also be obvious that the number of windings of filaments 108 and 126 can readily be increased by the use of more than three filament carriers 72 and filament support members 114. If desired, the side of tape 146 which does not contact mandrel 10 can be coated with a suitable release agent and the tape can be removed from the plastic tubing after it passes off the end of the mandrel.

Although the invention has been described with reference to particular apparatus, it should not be considered to be limited thereto since various modifications obviously could be made therein by one having ordinary skill in the art of filament winding, without departing from the spirit and scope of the invention as defined in the following claims.

What is claimed and desired to be secured by U.S. Letters Patent is:

1. A method of continuously producing wrapped tubing of indeterminate length upon a mandrel of finite length, comprising the steps of reciprocally moving divisible surface portions of said mandrel longitudinally thereof while rotating the mandrel about its longitudinal axis, effecting a net advance of said reciprocally moving surface portions along the mandrel, drawing tape from a stationary supply thereof alongside the mandrel upon and circumferentially about said rotating and reciprocally moving, rotating mandrel surface portions so that said drawn tape partakes of said net surface advance thereof and wrapping filaments from a plurality of supplies thereof moving in orbit around the mandrel at an orbital rate different from the rotative speed of the mandrel upon said wrapped tape as it partakes of said net advance of said surface portions, thereby to form continuous tubing which advances longitudinally of said mandrel.

2. The method defined in claim 1 including the step of heat-curing the formed tubing as it moves along the mandrel.

3. The method defined in claim 1 including the steps of placing a tube coupling element on the mandrel and wrapping said tape and filament thereabout to thereby integrate the coupling element into said formed tubing.

4. The method defined in claim 1 wherein said filaments are wrapped at different speeds upon and circumferentially about the tape wrapped on said mandrel surface portions as said tape partakes of said net surface advance thereof.

5. The method defined in claim 1 wherein said filaments are wrapped in sets at different speeds upon and circumferentially about the tape wrapped on said mandrel surface portions as said tape partakes of said net surface advance thereof, certain of said sets of filaments being wrapped at a first speed and in opposite directions about said tape to thereby form clockwise and counterclockwise helically wound filament layers having a first lead angle.

6. The method defined in claim 5 wherein certain of said sets of filaments are wrapped at a second speed and in opposite directions about said tape to thereby form clockwise and counterclockwise helically wound filament layers having a second lead angle.

7. The method defined in claim 1 wherein the net advance of said reciprocally moving surface portions is effected by advancing the surface portions slowly by cam action and returning the same rapidly by cam action.

8. The method defined in claim 1 wherein the net advance of said reciprocally moving surface portions is effected by advancing a majority of the surface portions slowly by cam action while returning at least one of the surface portions rapidly by cam action.

9. The method defined in claim 1 wherein the net advance of said reciprocally moving surface portions is effected by advancing all but one of the surface portions slowly and progressively by cam action while returning the one surface portion rapidly by cam action.

10. The method defined in claim 1 wherein the net advance of said reciprocally moving surface portions is effected by rapidly returning said surface portions one at a time in successive order by cam action while slowly and progressively advancing by cam action the surface portions which are not undergoing said return movement.

11. A method of continuously producing reinforced wrapped plastic tubing upon a mandrel of finite length, comprising the steps of reciprocally moving divisible surface portions of said mandrel longitudinally thereof while rotating the mandrel about its longitudinal axis, effecting a net surface advance of said reciprocally moving surface portions, drawing tape upon and circumferentially about said rotating and reciprocally moving mandrel surface portions so that said drawn tape partakes of said net surface advance thereof, and successively wrapping and drawing windings of dry and resin coated filaments on said tape at different rotative speeds and selectively in opposite directions as said tape partakes of said net advance of said surface portions, thereby to form continuous tubing which advances longitudinally of said mandrel.

References Cited

UNITED STATES PATENTS

| | | | |
|---|---|---|---|
| 3,498,862 | 3/1970 | Comostri et al. | 156—195 |
| 2,748,830 | 6/1956 | Nash et al. | 156—171 |
| 3,068,134 | 12/1962 | Cilker et al. | 156—172 |
| 3,130,104 | 4/1964 | Lewis et al. | 156—432 |
| 3,351,509 | 11/1967 | Richardson et al. | 156—195 |
| 3,441,459 | 4/1969 | Weidel | 156—294 X |

BENJAMIN R. PADGETT, Primary Examiner

E. E. LEHMANN, Assistant Examiner

U.S. Cl. X.R.

156—184, 191; 138—153